Patented Apr. 5, 1932

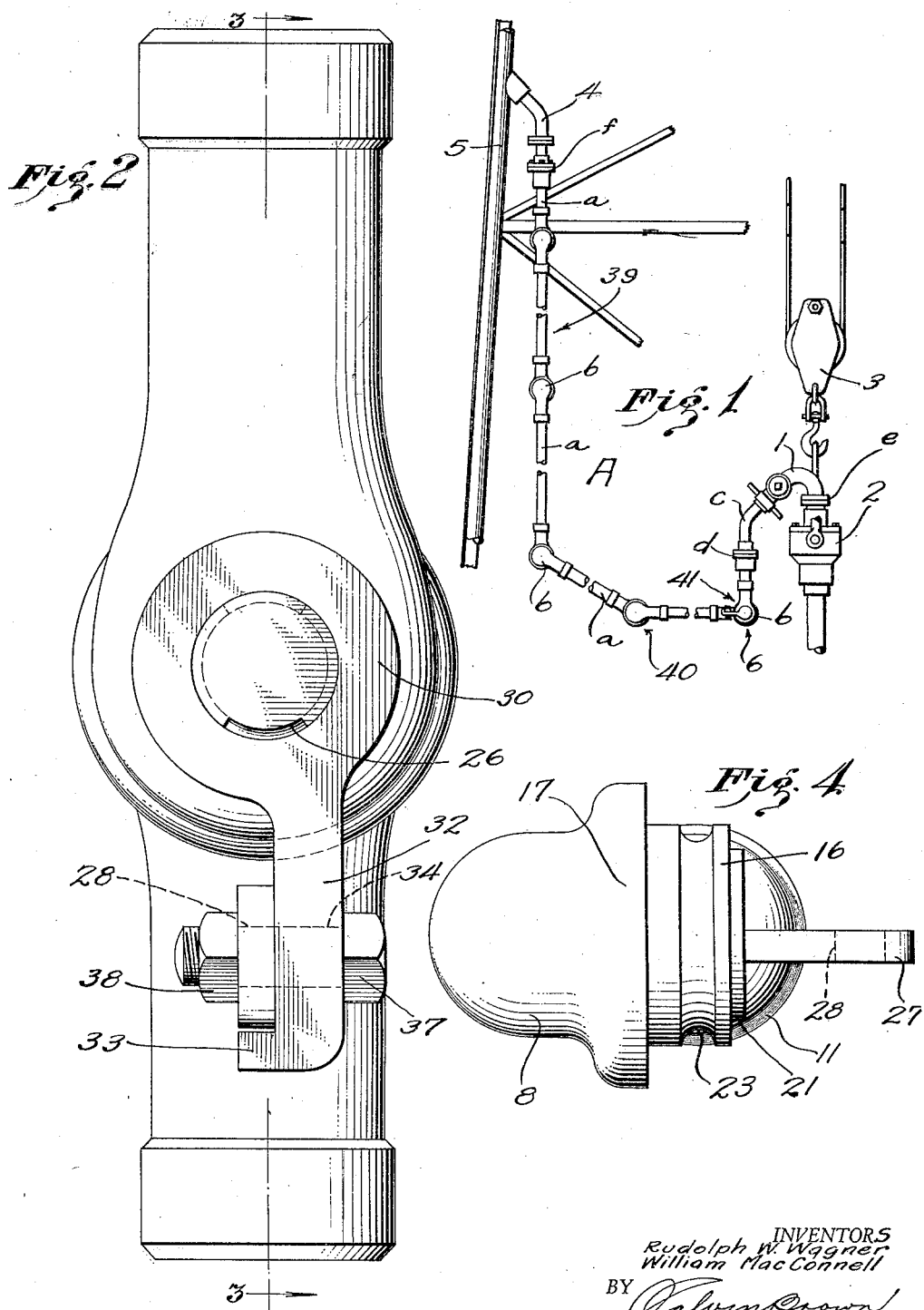

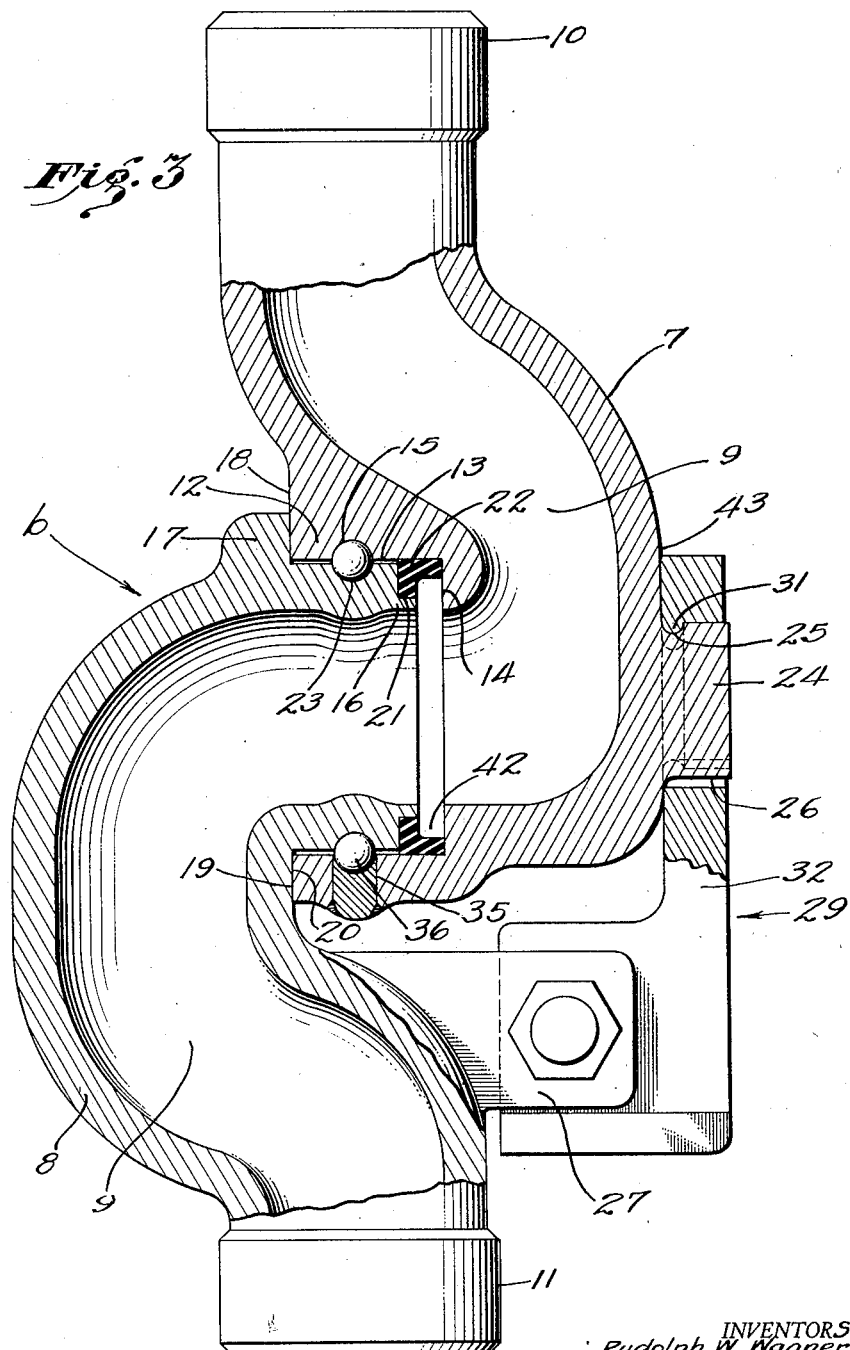

1,852,632

UNITED STATES PATENT OFFICE

RUDOLPH W. WAGNER, OF LOS ANGELES, AND WILLIAM MacCONNELL, OF HUNTINGTON PARK, CALIFORNIA

ROTARY HOSE

Application filed August 26, 1930. Serial No. 477,840.

This invention relates to rotary hose of the character known as the all-steel type.

More particularly the invention contemplates novel means for joining lengths of steel pipe whereby the rotary hose may hang freely.

The invention has for an object the provision of a joint so constructed as to permit steel pipe and the like to be moved to different positions without in any manner restricting the flow of fluid passing through the pipe and said joint.

Another object is the provision of a joint for rotary hose embodying features adapted to relieve strain from the swivel joint.

Another object is the provision of a joint for rotary hose which allows the rotary pipe to assume various positions without fear of any leak at the joint connection.

Other objects include a rotary hose which is inexpensive of manufacture, easily assembled, and generally superior to rotary hose now on the market.

With the above and other objects in view, the invention consists in the novel and useful provision, formation, construction, association, and relative arrangement of parts, members and features, all as shown in a certain embodiment in the accompanying drawings, described generally, and more particularly pointed out in the claims.

In the drawings:

Figure 1 is a fragmentary elevation of the improved rotary hose shown associated with oil well apparatus, Figure 2 is a plan view of the joint, Figure 3 is a sectional view on the line 3—3 of Figure 2, and, Figure 4 is an end view of an element of the invention.

Referring now with particularity to the drawings, the improved rotary hose is designated as an entirety by A, and the same includes lengths of pipe $a$ adapted to be interconnected by means of joints $b$. The last link of steel pipe shown at $c$ is adapted to be connected to a goose-neck 1 of a tubing head 2, and which tubing head is raised or lowered by means of an elevator 3. A pipe 4 is associated with a further pipe 5 which leads to a source of mud-laden fluid. Ordinarily, this mud-laden fluid is pumped by means of a slush pump through the pipe 5 into the rotary pipe. Needless to say, steel pipe has a great advantage over ordinary rubber tubing in that the steel pipe ordinarily does not weigh more than the rubber tubing or hose, yet the steel pipe is stronger, longer lived, and more durable, and does not become kinked. Many disastrous accidents have occurred by ordinary rubber hose or tubing breaking under high pressure, and it is generally known that when rubber hose breaks, that the break extends over a considerable area, which is usually not true of steel tubing.

The present invention does not show any more than the intermediate joints, it being realized that swivels $d$ are generally provided between the tubing $c$ and the first joint $b$ shown at 6, and also a swivel $e$ where the goose-neck connects with the tubing head. A swivel $f$ is provided for the last pipe $a$ and interconnects the said pipe with the pipe 4. A feature of the joint $b$ is that the joints are so arranged as to sustain weight of the different steel tubes without imposing stress upon the swivel portion of the joint.

The joint $b$ includes two swingingly connected members 7 and 8 both in the form of an elbow, which is to say that the passageway 9 of both members enters at one angle and leaves at an angle substantially 90° to the entrance. However, the so-called elbow is gradually curved so that any passage of fluid therethrough is not unduly abrupt. The part 7 of the joint is formed at one end with a flange 10, which is internally threaded for reception of one end of one of the pipes $a$ and a similar construction is resorted to for the part 8, as shown at 11. As stated, the passageway in the part 7 gradually changes its line of direction so that the direction is substantially at right angles to the entrance portion which would be at the zone of the flange 10. To this end, the part 7 is enlarged at 12. The bore is likewise enlarged, as shown at 13, so as to form a shoulder at 14. This enlarged part 12 is formed with an annular curved groove 15. The part 8 has a portion 16 which would be at right angles to the flange 11, fitted within the bore 13. Likewise, said part 8 is formed with a shoulder 17 adapted to abut against the surface 18 of the enlargement 12. The end 19 of the part 7 abuts against the surface 20 of the part 8. Thus, movement of the part 16 within the bore 13 is limited by the enlargement 17 abutting against the surface 18 and the end 19 abutting against the surface 20. In actual practice, the surface of contact between ends of said parts is substantially annular. The part 16 is cut away and shouldered at 21, and adapted to be received between the shoulder 14 and the cut-away shouldered portion 21 is an L-shaped annular gasket 22. It will be noted that this gasket is spaced from the inner surface of the passageway 9 of the parts 7 and 8 so that moving fluid passing through said parts 7 and 8 does not constantly act against the gasket 22. The part 8 is formed with an annular curved groove 23 which, when the two parts are in assemblage, as shown in Figure 3, are directly opposite or complementary. What would be termed the top of the part 7 is provided with an outstanding curved stud 24 provided at its base with an annular undercut or groove 25. The said stud is likewise formed with a segmental cut away or interrupted portion 26 which is in communication with the annular groove 25 (see Figures 2 and 3). The part 8 is provided on the surface thereof with an outstanding lug 27 formed with a transverse bore 28. The lug 27 along with the stud 24 and a member 29 are adapted to act as a lock for the parts 7 and 8 of the joint or coupling and likewise perform the very important function of sustaining the weight of the coupling and removing stress from bearing members, to be described.

The member 29 includes an annular part 30 having a segmental key part 31 projecting within the opening of said annular part 30. This annular part has joined thereto an arm 32 provided with an angular extremity 33. The arm 32 is formed with a transverse bore 34.

The part 7 is transversely bored at 35 and ball bearings 36 are adapted to be dropped through said bore and into the bearing race which is formed by the complementary curved grooves 15 and 23 when the parts are in position of assemblage, as shown in Figure 3. After the bearings are all in place, a plug 36 may be inserted in the transverse bore 35 and secured therein by brazing, as shown. The bearings will, of course, hold the parts 7 and 8 together as the bearings act as a lock between said parts and still permit the parts to relatively rotate or turn. In order to assure that undue stress should not be imposed upon the bearings and that a portion of the weight should be carried between the parts 7 and 8 irrespective of the bearings, the lock previously described is utilized. Furthermore, this lock acts to maintain the parts 7 and 8 in substantial alignment. Thus, it will be seen upon inspection of the drawing that the flanges 10 and 11 are in alignment. This lock is secured between the members in the following manner: The arm 29 is turned so that the key 31 may pass through the segmental slot 26 and be received in the key way or annular groove 25, whereupon the lock is turned in a clockwise direction, considering Figure 2, to where the arm 29 abuts against the stud 27. At this time, the transverse bores 28 and 34 will be in alignment and a bolt 37 is passed through said bores with a nut 38 for securing the bolt and holding the stud and arm together. The angular extremity 33 lies adjacent an end portion of the stud.

The operation, uses and advantages of the invention just described are as follows:

Assuming that the parts are assembled in the manner just described, it is evident that the parts 7 and 8 may relatively rotate. When the hose is hanging in a substantially vertical position, as shown in Figure 1 at 39, the weight of the pipe is largely carried by the member 29 secured between the parts 7 and 8 of the joint, and stress in a large manner removed from the ball bearings. Thus, the bearings are given reasonably free action within the race when it becomes necessary to cause the parts 7 and 8 to relatively move, as would be the case for the piping and joints shown at 40 and 41.

It is thought that the locked arrangement that exists between the two parts of the joint is novel and that the bearing arrangement and the combination shown are likewise novel.

The gasket or packing 22 is normally out of the flow path of any mud-laden fluid passing through the joint, that is to say, the packing is not in alignment with the flow path so that there is normally a dead space at 42. Hence, the packing will last indefinitely. Furthermore, the packing arrangement is such that the roller bearings are at all times protected from grit and the like, to the end that damage to the bearings is unlikely. It will be noted that the top surface 43 of the part 7 is substantially flat where the arm 32 engages the same. Thus, when fluid is passing through the parts and pressure is exerted between the parts by said fluid which would normally tend to separate the parts, the arm 32 by engaging the flat surface of the part 7 and likewise the stud along with its engagement with the stud 27, effectively resists such movement—an important feature in this invention.

It is obvious that various changes and modifications and variations may be made in practicing the invention in departure from the true spirit of the invention.

We claim:

1. In steel rotary hose construction, a joint comprising two inter-connected parts, one of said parts being provided with a stud formed with an annular keyway, an arm formed with a key for reception in said keyway of the stud, and means for securing said arm to the other of said joint members.

2. In rotary hose construction, a two-part joint, a stud on one of said parts, said stud being formed with an annular groove and with a segmental slot communicating with said groove, an arm formed with an opening and with a segmental key adapted to be passed through said segmental slot of the stud for reception in the annular groove to lock said arm to said stud, and means for securing said arm to the other member of said joint when the arm is so locked to the first joint member.

In testimony whereof, we have signed our names to this specification at Los Angeles, California, this 12th day of August, 1930.

RUDOLPH W. WAGNER.
WILLIAM MacCONNELL.